US012724287B2

(12) United States Patent
Xu et al.

(10) Patent No.: US 12,724,287 B2
(45) Date of Patent: Sep. 1, 2026

(54) LENS DRIVING DEVICE

(71) Applicant: Changzhou AAC Raytech Optronics Co., Ltd., Chanzhou City (CN)

(72) Inventors: Tongming Xu, Changzhou (CN); Suohe Wei, Changzhou (CN)

(73) Assignee: Changzhou AAC Raytech Optronics Co., Ltd., Changzhou City (CN)

(*) Notice: Subject to any disclaimer, the term of this patent is extended or adjusted under 35 U.S.C. 154(b) by 280 days.

(21) Appl. No.: 18/544,378

(22) Filed: Dec. 18, 2023

(65) Prior Publication Data

US 2024/0337859 A1 Oct. 10, 2024

Related U.S. Application Data

(63) Continuation of application No. PCT/CN2023/086236, filed on Apr. 4, 2023.

(51) Int. Cl.
*G02B 27/64* (2006.01)

(52) U.S. Cl.
CPC .................................. *G02B 27/646* (2013.01)

(58) Field of Classification Search
CPC .......... G02B 27/646; G02B 7/04; G02B 7/09; G03B 5/00; G03B 5/04; G03B 13/36
See application file for complete search history.

(56) References Cited

U.S. PATENT DOCUMENTS

2015/0103195 A1* 4/2015 Kwon .................... H04N 23/54 348/208.12
2017/0322476 A1* 11/2017 Bai ........................ G03B 13/36
2017/0351159 A1* 12/2017 Kudo ....................... G03B 5/00
2019/0204531 A1* 7/2019 Sugawara ................ G03B 5/06
2019/0243087 A1* 8/2019 Osaka ...................... G03B 3/10
2019/0289180 A1* 9/2019 Wang ....................... G02B 7/04

* cited by examiner

*Primary Examiner* — Jia X Pan
(74) *Attorney, Agent, or Firm* — Viersch Law Group

(57) ABSTRACT

A lens driving device is provided and includes: a base, where the base defines a middle hole at a center of the base and penetrating through the base; a supporting frame defining an accommodation space; a lens barrel holder accommodated in the accommodation space and spaced apart from the supporting frame for installing a lens module; an elastic assembly fixed on two opposing sides of the supporting frame in an optical axis direction; at least one anti-shake coil fixed on the base; and at least one magnet fixed on the supporting frame, where each respective magnet is spaced apart from and opposite to a respective anti-shake coil of the at least one anti-shake coil. Compared with the related technologies, the lens driving device of the present disclosure has good anti-shake effect, saves installation space and has good experience effect.

9 Claims, 6 Drawing Sheets

LENS DRIVING DEVICE

CROSS REFERENCE TO RELATED APPLICATIONS

The present application is a continuation of PCT Patent Application No. PCT/CN2023/086236, filed Apr. 4, 2023, which is incorporated by reference herein in its entirety.

TECHNICAL FIELD

The various embodiments described in this document relate in general to a driving device, and more specifically to a lens driving device.

BACKGROUND

With the development of camera technologies, lens driving devices have been widely used in various camera devices. The combination of the lens driving device and various portable electronic devices, such as mobile phones, cameras, computers, and the like is favored by consumers.

A driving mechanism of the lens driving device in the related technologies is generally formed by combining coils and magnets. A supporting frame is supported on a base, a lens barrel holder is arranged at a central hole of the base, and driving coils and driving magnet are respectively fixed on the lens barrel holder and the supporting frame. An optical image stabilization (OIS) coil (anti-shake coil) is fixed to a housing and above the supporting frame, and an anti-shake magnet is fixed to a side of the supporting frame away from the base. When current is applied to the anti-shake coil, the anti-shake coil and the anti-shake magnet generate electromagnetic field, and the anti-shake coil drives, under the action of the Lorentz force of the electromagnetic field, the anti-shake magnet to move in a direction perpendicular to an optical axis, so as to drive a lens barrel to realize OIS anti-shake performance.

However, in the lens driving device of the related technologies, because one side of the anti-shake coil is close to the central hole of the base, which may easily cause deformation of the anti-shake coil and the anti-shake coil easily exceeds the central hole due to the influence of assembly tolerance, thereby resulting in occupying installation space and poor overall assembly.

Therefore, it is necessary to provide a new lens driving device to solve the above problems.

SUMMARY

The present disclosure aims to solve technical problems of providing a lens driving device, which is small in size and simple in assembly, thereby saving installation space.

To solve the technical problems, the present disclosure provides a lens driving device, which includes: a base, where the base defines a middle hole at a center of the base and penetrating through the base; a supporting frame defining an accommodation space, where the supporting frame is aligned with and spaced apart from the base; a lens barrel holder accommodated in the accommodation space and spaced apart from the supporting frame for installing a lens module; an elastic assembly fixed on two opposing sides of the supporting frame in an optical axis direction and configured to elastically suspend the lens barrel holder in the accommodation space; at least one anti-shake coil fixed on the base; and at least one magnet fixed on the supporting frame, where each respective magnet is spaced apart from and opposite to a respective anti-shake coil of the at least one anti-shake coil, the respective anti-shake coil interacts with the respective magnet to drive the supporting frame to move in a direction perpendicular to an optical axis of the lens barrel holder to drive the lens barrel holder to move synchronously. The respective anti-shake coil has an annular shape, the respective anti-shake coil is provided with an arc-shaped structure on one side close to the middle hole, and the arc-shaped structure is bent in a direction away from the middle hole, and where the arc-shaped structure matches an outer peripheral shape of the middle hole so that the respective anti-shake coil is completely located outside the middle hole.

In some embodiments, the respective anti-shake coil is in a shape of a track and includes two opposing long sides and two opposing short sides, and the arc-shaped structure is disposed on a long side of the two opposing long sides near the middle hole.

In some embodiments, the base has a rectangular shape, and the at least one anti-shake coil is configured as four anti-shake coils, where the four anti-shake coils are arranged around the middle hole and respectively fixed on and parallel to four sides of the base; and the at least one magnet is configured as four magnets, the four magnets are respectively fixed on the supporting frame, and the four anti-shake coils are respectively arranged in one-to-one correspondence with the four magnets.

In some embodiments, the lens driving device further includes a flexible printed circuit configured to be connected with an external power supply, the flexible printed circuit is fixed on a side of the base close to the at least one magnet, and the at least one anti-shake coil is disposed and fixed on the flexible printed circuit and electrically connected with the flexible printed circuit.

In some embodiments, the elastic assembly includes at least one upper elastic sheet and at least one lower elastic sheet, where each respective upper elastic sheet includes at least one first fixing arm fixed to the supporting frame, a second fixing arm fixed to the lens barrel holder, and a plurality of first elastic arms connecting the at least one first fixing arm and the second fixing arm, where each first elastic arm is spaced apart from the supporting frame in the optical axis direction of the lens barrel holder; and each lower elastic sheet includes a third fixing arm fixed on a side of the supporting frame near the base, a fourth fixing arm fixed on the lens barrel holder, and a second elastic arm connecting the third fixing arm and the fourth fixing arm, where the second elastic arm is spaced apart from the supporting frame in the optical axis direction of the lens barrel holder.

In some embodiments, the lens driving device further includes at least one suspension wire, where the at least one suspension wire is configured as a plurality of suspension wires and the plurality of suspension wires are spaced apart from one another, and where one end of each respective suspension wire is fixed to the base and another end of the respective suspension wire is fixed to the supporting frame, and the supporting frame is suspended on the base.

In some embodiments, the lens driving device further includes at least one horizontal support elastic member, where a respective horizontal support elastic member of the at least one horizontal support elastic member includes a first arm fixed to the respective suspension wire, a second arm fixed to the supporting frame, and an elastic arm connecting the first arm and the second arm.

In some embodiments, the supporting frame includes a rectangular frame body and four fixing structures respectively located at four corners of the supporting frame, where the at least one upper elastic sheet is configured as two upper elastic sheets and the two upper elastic sheets are spaced apart from each other and directly facing each other, where each of the upper elastic sheet includes two first elastic arms spaced apart from each other, and four first fixing arms are in one-to-one correspondence with the four fixing structures, and where the at least one magnet is fixed on a side of the frame body close to the lens barrel holder.

In some embodiments, the lens driving device further includes at least one focusing coil, a respective focusing coil of the at least one focusing coil is fixedly sleeved on the lens barrel holder and spaced apart from the respective magnet, and the at least one focusing coil interacts with the at least one magnet to drive the lens barrel holder to move along the optical axis direction, so as to realize an auto-focusing function.

In some embodiments, the flexible printed circuit further includes a circuit board body fixed to the base and a pin bent and extended toward the base by one side of the circuit board body.

Compared with the related technologies, in the lens driving device of the present disclosure, an arc-shaped structure is arranged on one side of the anti-shake coil close to the middle hole, which is bent in the direction away from the middle hole, and the arc-shaped structure matches the outer peripheral shape of the middle hole so that the anti-shake coil is completely located outside the range of the middle hole. In this way, the side (i.e., the middle part) of the anti-shake coil near the middle hole is shaped into an inner concave structure according to a predetermined shape, which is beneficial to ensuring that the anti-shake coil does not exceed the middle hole 14 while maintaining the size and a driving force of the anti-shake coil, such that the space of the product can be fully utilized, and the lens driving device 100 may be miniaturized as a whole, thereby improving the user experience effect.

BRIEF DESCRIPTION OF THE DRAWINGS

In order to more clearly explain the technical solutions in embodiments of the present disclosure, the drawings required for use in the description of the embodiments may be briefly introduced below. It is obvious that the drawings described below are merely some embodiments of the present disclosure, and other drawings can be obtained according to the drawings without any creative effort by those of ordinary skill in the art.

DETAILED DESCRIPTION OF THE EMBODIMENTS

The technical solutions in the embodiments of the present disclosure may be clearly and completely described in conjunction with the drawings in the embodiment of the present disclosure. Obviously, the described embodiments are only some embodiments of the present disclosure, rather than all the embodiments. Based on the embodiments in the present disclosure, all other embodiments obtained by those skilled in the art without making creative labor belong to the protection scope of the present disclosure.

Figure 1:
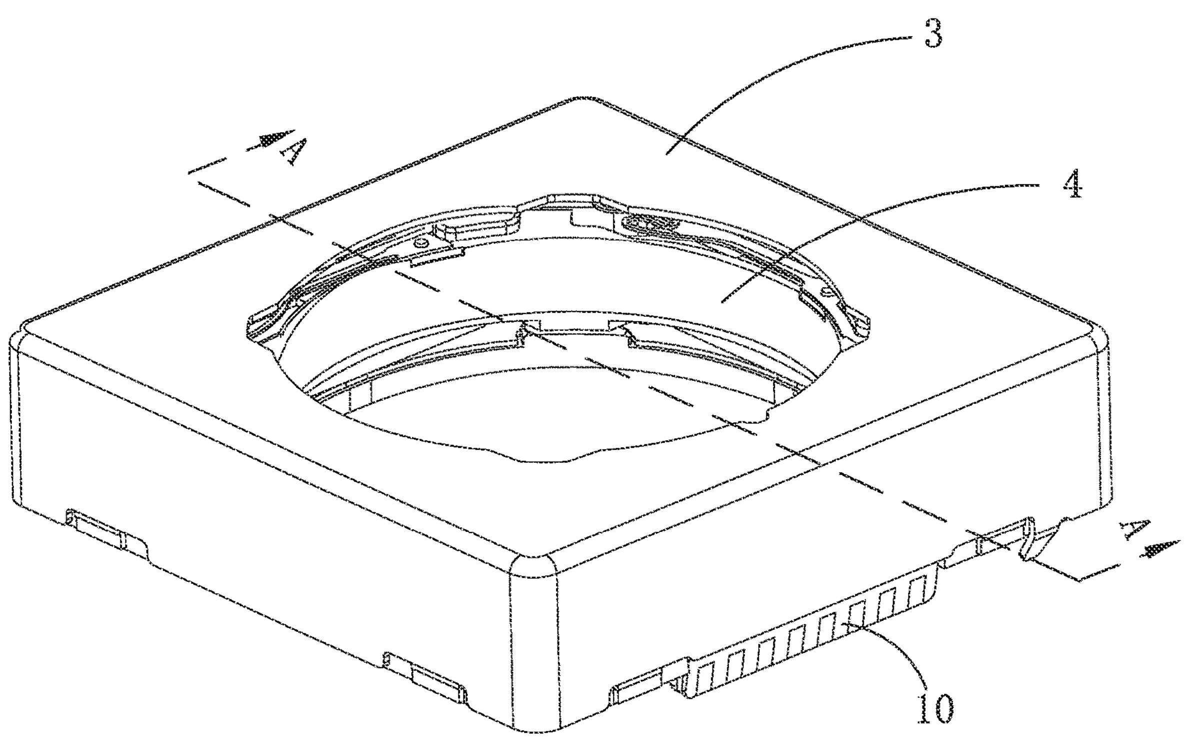
FIG. 1 is a schematic three-dimensional structural view of a lens driving device of the present disclosure.
Figure 1:
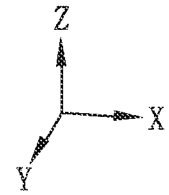
Figure 2:
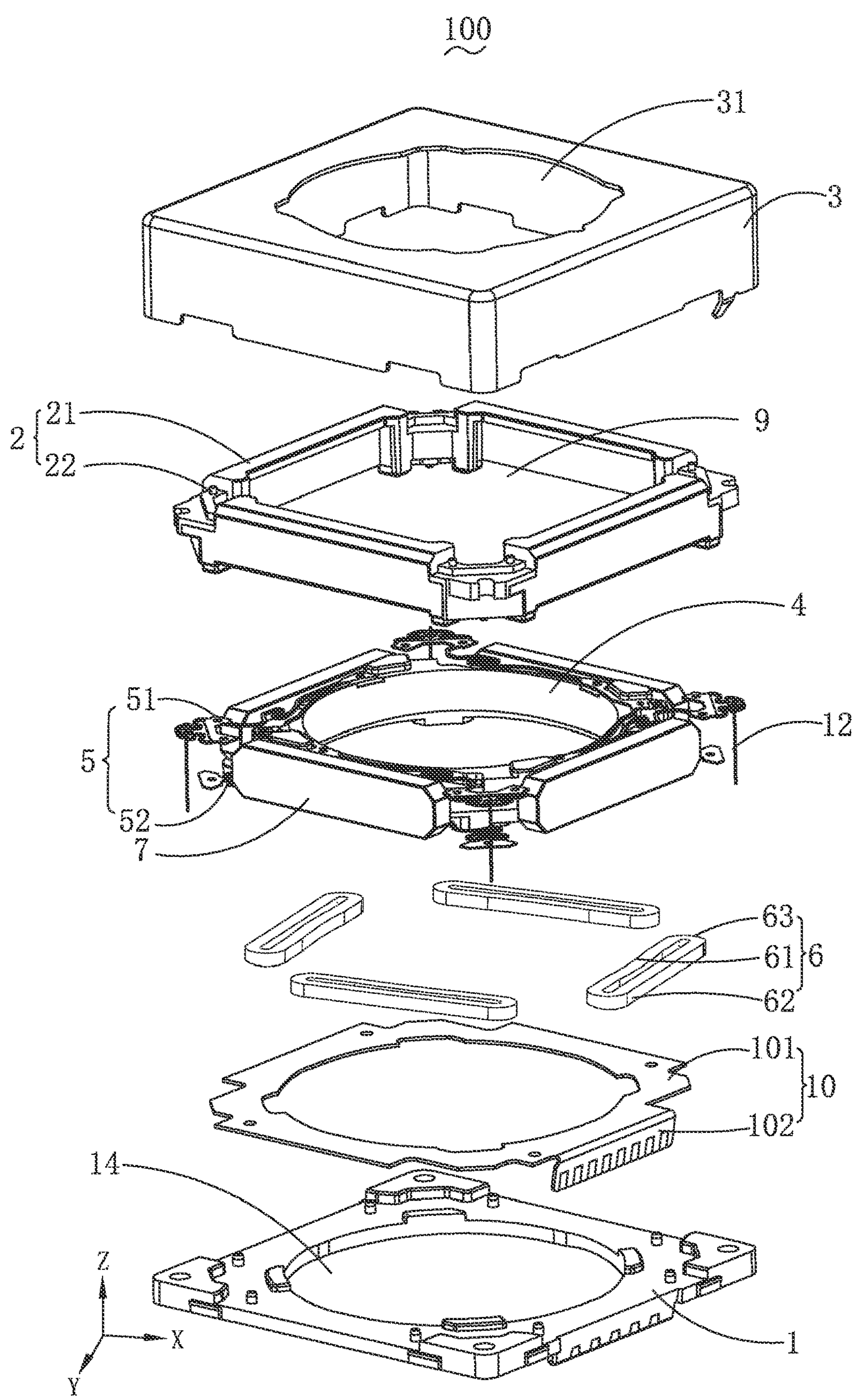
FIG. 2 is a schematic exploded view of the lens driving device of the present disclosure.
Figure 3:
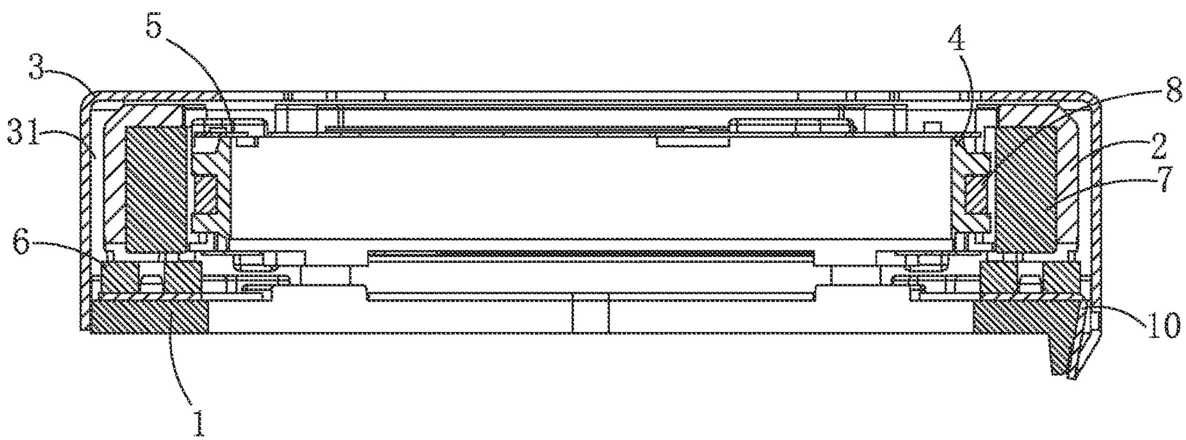
FIG. 3 is a cross-sectional view of the lens driving device along line A-A in FIG. 1.
Figure 4:
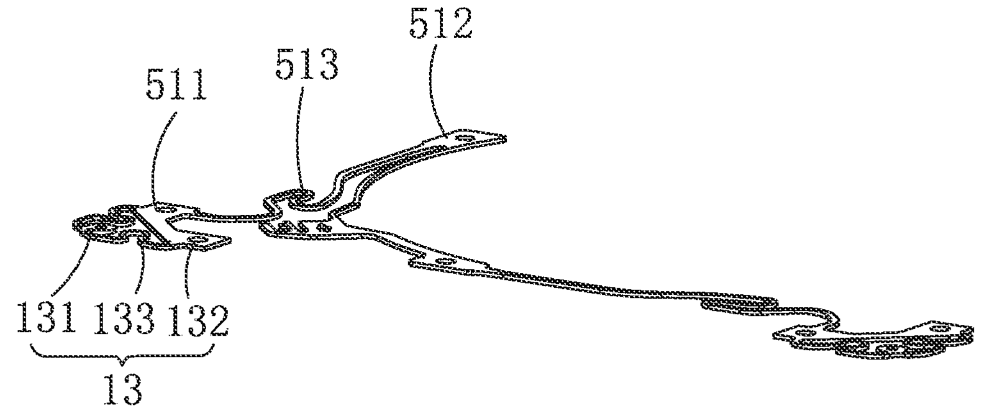
FIG. 4 is a structural schematic diagram of an upper elastic sheet of the present disclosure.
Figure 5:
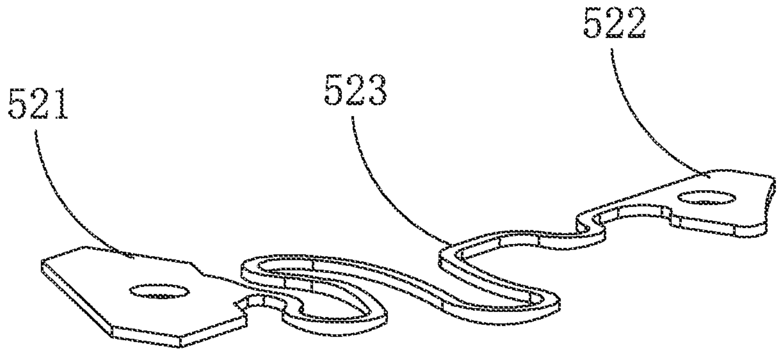
FIG. 5 is a structural schematic diagram of a lower elastic sheet of the present disclosure.
Figure 6:
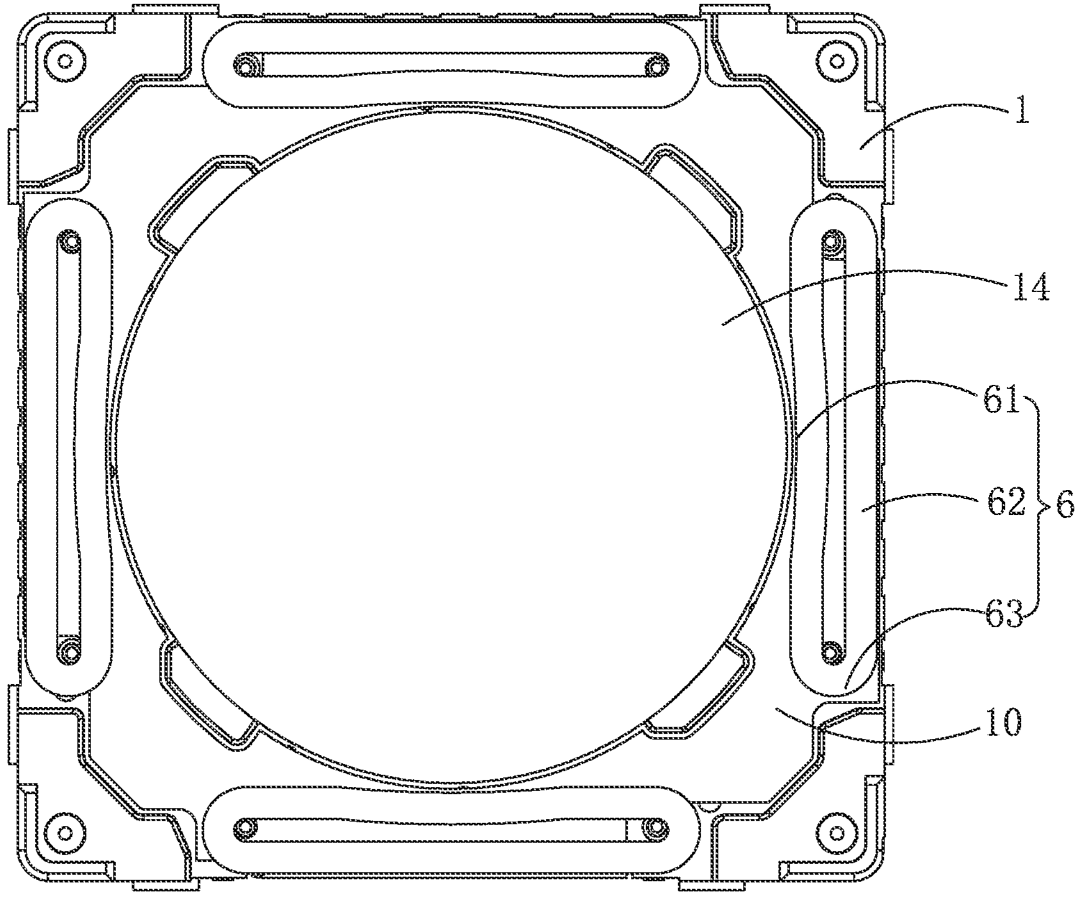
FIG. 6 is a top view of a base, a flexible printed circuit, and at least one anti-shake coil that are assembled of the present disclosure.

Referring to FIGS. 1 to 6, a lens driving device 100 is provided and includes a base 1, a supporting frame 2, at least one suspension wire 12, a housing 3, a lens barrel holder 4, at least one anti-shake coil 6, at least one magnet 7, at least one focusing coil 8, an elastic assembly 5, and a flexible printed circuit 10.

The base 1 defines a middle hole 14 at a center of the base 1 and penetrating the base 1, and the lens barrel holder 4 is disposed in the middle hole 14. The base 1 is configured to support and fix the flexible printed circuit 10 and the at least one anti-shake coil 6.

The supporting frame 2 has an accommodation space 9, and the supporting frame 2 directly faces (is aligned with) the base 1 and is spaced apart from the base 1.

In the present embodiment, the lens driving device 100 further includes the housing 3, the housing 3 is arranged on the base 1 and defines a receiving space 31 with the base 1. The lens driving device 100 further includes the at least one suspension wire 12 configured to movably support the supporting frame 2 within the receiving space 31. One end of each respective suspension wire 12 is connected to the base 1, and the other end of the respective suspension wire 12 is connected to the elastic assembly 5. The at least one suspension wire 12 is made of a metal conductive material, and is configured as a plurality of suspension wires. The plurality of suspension wires are arranged around the supporting frame 2 at intervals. One end of each respective suspension wire 12 of the plurality of suspension wires 12 is fixed to the base 1, and the other end of the respective suspension wire 12 is fixed to an upper elastic sheet 51 to form an electrical connection. The at least one suspension wire 12 is used to provide a restoring force to the supporting frame 2 during performing of the anti-shake function.

The lens barrel holder 4 is housed in the accommodation space 9 for mounting a lens module having an optical axis (Z axis).

The elastic assembly 5 is fixed on two opposing sides of the supporting frame 2 in a direction parallel to the optical axis (i.e., in an optical axis direction), and elastically supports the lens barrel holder 4 in the accommodation space 9. With such configuration, when the current is applied to the at least one anti-shake coil 6, the at least one anti-shake coil 6 and the at least one magnet 7 generate an electromagnetic field, and the at least one anti-shake coil 6 drives, under the action of the Lorentz force of the electromagnetic field, the at least one magnet 7 to move in a direction perpendicular to the optical axis, so as to drive a lens barrel to realize optical image stabilization (OIS) performance.

The at least one anti-shake coil 6 is fixed to the base 1. The at least one anti-shake coil 6 is fixed on the base 1, and each of the at least one magnet 7 is fixed on a side of the supporting frame 2 close to the lens barrel holder 4. The at least one anti-shake coil 6 is located within a magnetic field range of the at least one magnet 7 and drives the at least one magnet 7 to move in the direction perpendicular to the optical axis. The anti-shake coil 6 is formed by pre-winding, and a plane in which a winding direction of the anti-shake coil 6 is located is perpendicular to the optical axis direction. In this way, cost of the at least one anti-shake coil 6 can be greatly reduced.

The at least one magnet 7 is fixed to the supporting frame 2 and each magnet 7 is spaced apart from and facing a respective anti-shake coil 6 of the at least one anti-shake coil 6. The at least one anti-shake coil 6 interacts with the at least one magnet 7 to drive the supporting frame 2 to move in a direction perpendicular to the optical axis of the lens barrel holder, so as to drive the lens barrel holder 4 to move synchronously. The at least one magnet 7 includes first driving magnets 7 respectively fixed on two opposing sides of the supporting frame 2 in the direction perpendicular to the optical axis and second driving magnets 7 respectively fixed on the other two opposing sides of the supporting frame 2. Each magnet 7 is unipolar-magnetized. A single magnetic pole is provided on each of two opposite sides of the respective magnet 7.

The flexible printed circuit 10 is fixed on the base 1, and is configured to be electrically connected with an external power supply. The flexible printed circuit 10 is fixed on a side of the base 1 close to the at least one magnet 7. The at least one anti-shake coil 6 is disposed and fixed on the flexible printed circuit 10 and electrically connected with the flexible printed circuit 10.

Each respective anti-shake coil 6 of the at least one anti-shake coil 6 has an annular shape. One side of the respective anti-shake coil 6 close to the middle hole 14 is provided with an arc-shaped structure 61 that is bent in a direction away from the middle hole 14, and the arc-shaped structure 61 matches an outer peripheral shape of the middle hole 14 so that the respective anti-shake coil 6 is completely located outside the range of the middle hole 14. By shaping a side (i.e., a middle part) of the respective anti-shake coil 6 near the middle hole 14 into the arc-shaped structure 61 according to a predetermined shape, it is possible to ensure that the respective anti-shake coil does not exceed (cover, or be spaced apart from) the middle hole 14 while maintaining the size and a driving force of the respective anti-shake coil unchanged, such that the space of the product can be fully utilized, and the lens driving device 100 may be miniaturized as a whole, thereby improving the effect of the user experience.

Specifically, the lens driving device 100 further includes at least one focusing coil 8. The at least one focusing coil 8 is fixedly sleeved on the lens barrel holder 4 and a respective focusing coil 8 of the at least one focusing coil 8 is spaced apart from the respective magnet 7. That at least one focusing coil 8 interacts with the at least one magnet 7 to drive the lens barrel holder 4 to move along the optical axis direction, thereby realizing an auto-focusing (AF) function. Each focusing coil 8 is sleeved and fixed on an outer periphery of the lens barrel holder 4 and spaced apart from the respective magnet 7. The at least one focusing coil 8 is electrically connected with the upper elastic sheet 51. A magnetization direction of the respective magnet 7 is parallel to a plane in which a winding direction of the respective focusing coil 8 is located, to drive the respective focusing coil 8 to move along the optical axis direction. The at least one focusing coil 8 drives the lens barrel holder 4 to move along the optical axis direction, thereby realizing the AF function. In this embodiment, the magnetization direction of the respective magnet 7 is parallel to the plane in which the winding direction of the respective focusing coil 8 is located.

It shall be understood that the magnetization direction of each magnet 7 may be perpendicular to the optical axis direction.

The lens barrel holder 4, the at least one focusing coil 8, the at least one anti-shake coil 6, the at least one magnet 7, and the flexible printed circuit 10 are all housed in the housing 3.

In this embodiment, each anti-shake coil 6 is in a shape of a track and includes two opposite long sides 62 and two opposite short sides 63 connected between the two opposite long sides 62. The arc-shaped structure 6 is disposed on a long side 62 of the two opposite long sides 62 close to the middle hole 14. With such configuration, the space of the product can be fully utilized, so that the overall lens driving device 100 is miniaturized and the user experience effect is improved.

In this embodiment, the base 1 has a rectangular shape, and the at least one anti-shake coil 6 includes four anti-shake coils 6. The four anti-shake coils 6 are arranged around the middle hole 14 and respectively fixed on four sides of the base 1. The four anti-shake coils 6 are respectively parallel to the four sides of the base 1. The at least one magnet 7 includes four magnets 7 and the four magnets 7 are respectively fixed to the supporting frame 2. The four anti-shake coils 6 are respectively arranged in one-to-one correspondence with the four magnets 7. With such configuration, driving forces in different directions can be adjusted through the plurality of anti-shake coils 6 and the plurality of magnets 7 that are arranged in one-to-one correspondence. For example, driving directions perpendicular to each other on a same plane are set as a first direction and a second direction, where the first direction is an X-axis direction and the second direction is a Y-axis direction. By electrically connecting different anti-shake coils 6, shake adjustment in different directions can be realized, which is convenient in operation.

In this embodiment, the elastic assembly 5 includes at least one upper elastic sheet 51 and at least one lower elastic sheet 52. Each upper elastic sheet 51 includes at least one first fixing arm 511 fixed to the supporting frame 2, a second fixing arm 512 fixed to the lens barrel holder 4, and a plurality of first elastic arms 513 connecting the at least one first fixing arm 511 and the second fixing arm 512. Each first elastic arm 513 is spaced apart from the supporting frame 2 in the optical axis direction of the lens barrel holder 4. Each respective lower elastic sheet 52 includes a third fixing arm 521 fixed on a side of the supporting frame 2 near the base 1, a fourth fixing arm 522 fixed to the lens barrel holder 4, and a second elastic arm 523 connecting the third fixing arm 521 and the fourth fixing arm 522. The second elastic arm 523 is spaced apart from the supporting frame 2 in the optical axis direction of the lens barrel holder 4.

One end of each respective upper elastic sheet 51 is fixed to a top end of the supporting frame 2 in the optical axis direction of the lens barrel holder 4, and the other end of the respective upper elastic sheet 51 is fixed to a top end of the lens barrel holder 4 in the optical axis direction, so that the lens barrel holder 4 is elastically suspended in the accommodation space 9. In this embodiment, the respective upper elastic sheet 51 is provided with a conductive path for realizing transmission of electrical signals. For example, the upper elastic sheet 51 is a flexible printed circuit (FPC), and the conductive path is realized by a conductive wire on the FPC.

The at least one upper elastic sheet 51 is configured as two upper elastic sheets 51, the two upper elastic sheets 51 are insulated from each other and form a ring together, and each of the upper elastic sheets 51 forms a conductive path, so as to realize the transmission of positive and negative poles of electrical signals. In this embodiment, the two upper elastic sheets 51 are centrally symmetrical with respect to the lens barrel holder 4. It shall be understood that the two upper elastic sheets 51 may also be an integral structure, and only the two conductive paths need to be insulated from each other, which are not described in detail herein.

One end of the respective lower elastic sheet 52 is fixed to a bottom end of the supporting frame 2 in the optical axis direction, and the other end of the respective lower elastic sheet 52 is fixed to a bottom end of the lens barrel holder 4 in the optical axis direction. The upper elastic sheets 51 and the at least one lower elastic sheet 52 together elastically support the lens barrel holder 4 in the accommodation space 9, which can be used for providing the restoring force to the lens barrel holder 4 when the AF function is provided.

In this embodiment, the lens driving device 100 further includes at least one horizontal support elastic member 13. A respective horizontal support elastic member 13 of the at least one horizontal support elastic member 13 includes a first arm 131 fixed to the respective suspension wire 12, a second arm 132 fixed to the supporting frame 2, and an elastic arm 133 connecting the first arm 131 and the second arm 132. By fixing the two ends of the respective suspension wire 12 to the first arm 131 and the base 1 respectively, the base 1 and the supporting frame 2 can be suspended.

In the present embodiment, the supporting frame 2 includes a rectangular frame body 21 and four fixing structures 22 respectively located at four corners of the supporting frame 2. There are two upper elastic sheets 51 and the two upper elastic sheets 51 are spaced apart from each other and directly facing each other. Each of the upper elastic sheets 51 includes two first fixing arms 511 spaced apart from each other, and the four first fixing arms 511 are respectively in one-to-one correspondence with the four fixing structures 22. The at least one magnet 7 is fixed to a side of the frame body 21 near the lens barrel holder 4, which facilitates the fixing of the upper elastic sheets 51 to the fixing structures 22, thereby improving the fixing effect of the lens barrel holder 4 and making the lens barrel holder 4 more stable. Optionally, each first fixing arm 511 defines a plurality of mounting holes penetrating the first fixing arm 511, and the fixing structure 22 includes a plurality of fixing columns corresponding respectively to the plurality of mounting holes, and the plurality of mounting holes are respectively sleeved with the plurality of fixing columns to form a fixed connection.

In this embodiment, the flexible printed circuit 10 further includes a circuit board body 101 fixed to the base 1 and a pin 102 bent and extended toward the base 1 by one side of the circuit board body 101. The pin 102 facilitates the flexible printed circuit 10 to be connected to an external signal line.

Compared with the related technologies, in the lens driving device of the present disclosure, an arc-shaped structure is arranged on one side of the anti-shake coil close to the middle hole, which is bent in the direction away from the middle hole, and the arc-shaped structure matches the outer peripheral shape of the middle hole so that the anti-shake coil is completely located outside the range of the middle hole. In this way, the side (i.e., the middle part) of the anti-shake coil near the middle hole is shaped into an inner concave structure according to a predetermined shape, which is beneficial to ensuring that the anti-shake coil does not exceed the middle hole 14 while maintaining the size and a driving force of the anti-shake coil, such that the space of the product can be fully utilized, and the lens driving device 100 may be miniaturized as a whole, thereby improving the user experience effect.

The above-mentioned is only the implementation of the present disclosure, and it shall be noted that for those skilled in the art, improvements can be made on the premise of not departing from the creative conception of the present disclosure, which shall be fall within the protection scope of the present disclosure.

What is claimed is:

1. A lens driving device, comprising:

a base, wherein the base defines a middle hole at a center of the base and penetrating the base;

a supporting frame defining an accommodation space, wherein the supporting frame is directly facing and spaced apart from the base;

a lens barrel holder accommodated in the accommodation space and spaced apart from the supporting frame for installing a lens module;

an elastic assembly fixed on two opposing sides of the supporting frame in an optical axis direction and configured to elastically suspend the lens barrel holder in the accommodation space;

at least one anti-shake air core coil fixed on the base; and at least one magnet fixed on the supporting frame, wherein each respective magnet is spaced apart from and opposite to a respective anti-shake air core coil of the at least one anti-shake air core coil, the respective anti-shake air core coil interacts with the respective magnet to drive the supporting frame to move in a direction perpendicular to an optical axis of the lens barrel holder to drive the lens barrel holder to move synchronously, wherein the respective anti-shake air core coil has an annular shape, the respective anti-shake air core coil is provided with an arc-shaped structure on one side of the respective anti-shake air core coil close to the middle hole, and the arc-shaped structure is bent in a direction away from the middle hole, and wherein the arc-shaped structure matches an outer peripheral shape of the middle hole so that the respective anti-shake air core coil is completely located outside the middle hole;

further comprising a flexible printed circuit configured to be connected with an external power supply, the flexible printed circuit is fixed in contact with the base on a side of the base close to the at least one magnet, and the at least one anti-shake air core coil is disposed and fixed on the flexible printed circuit and electrically connected with the flexible printed circuit;

wherein multiple pairs of protrusions are provided on the side of the base close the at least one magnet; the flexible printed circuit is formed with multiple through holes, each of which is provided for one of the multiple pairs of protrusions to pass through; one protrusion from each pair of protrusions passes through the through-hole at the end located inside the anti-shake air core coil, while the other protrusion from each pair does not pass through the flexible circuit board at the other end located inside the anti-shake air core coil.

2. The lens driving device of claim 1, wherein the respective anti-shake air core coil is in a shape of a track and includes two opposing long sides and two opposing short sides connected between the two opposing long sides, and the arc-shaped structure is disposed on a long side of the two opposing long sides near the middle hole.

3. The lens driving device of claim 1, wherein the base has a rectangular shape, and the at least one anti-shake air core coil is configured as four anti-shake air core coils, wherein the four anti-shake air core coils are arranged around the middle hole and respectively fixed on and parallel to four sides of the base; and wherein the at least one magnet is configured as four magnets, the four magnets are respectively fixed on the supporting frame, and the four anti-shake air core coils are respectively arranged in one-to-one correspondence with the four magnets.

4. The lens driving device of claim 1, wherein the elastic assembly includes at least one upper elastic sheet and at least one lower elastic sheet, wherein each respective upper elastic sheet includes at least one first fixing arm fixed to the supporting frame, a second fixing arm fixed to the lens barrel holder, and a plurality of first elastic arms connecting the at least one first fixing arm and the second fixing arm, wherein each first elastic arm is spaced apart from the supporting frame in the optical axis direction of the lens barrel holder; and wherein each lower elastic sheet includes a third fixing arm fixed on a side of the supporting frame near the base, a fourth fixing arm fixed on the lens barrel holder, and a second elastic arm connecting the third fixing arm and the fourth fixing arm, wherein the second elastic arm is spaced apart from the supporting frame in the optical axis direction of the lens barrel holder.

5. The lens driving device of claim 4, wherein the supporting frame includes a rectangular frame body and four fixing structures respectively located at four corners of the supporting frame, wherein the at least one upper elastic sheet is configured as two upper elastic sheets and the two upper elastic sheets are spaced apart from each other and directly facing each other, wherein the respective upper elastic sheet includes two first elastic arms spaced apart from each other, and four first fixing arms are in one-to-one correspondence with the four fixing structures, and wherein the at least one magnet is fixed on a side of the frame body close to the lens barrel holder.

6. The lens driving device of claim 1, wherein the lens driving device further comprises at least one suspension wire, wherein the at least one suspension wire is configured as a plurality of suspension wires and the plurality of suspension wires are spaced apart from one another, and wherein each respective suspension wire has an end fixed to the base and has another end fixed to the supporting frame, and the supporting frame is suspended on the base.

7. The lens driving device of claim 6, wherein the lens driving device further comprises at least one horizontal support elastic member, wherein a respective horizontal support elastic member of the at least one horizontal support elastic member includes a first arm fixed to the respective suspension wire, a second arm fixed to the supporting frame, and an elastic arm connecting the first arm and the second arm.

8. The lens driving device of claim 1, wherein the lens driving device further comprises at least one focusing coil, a respective focusing coil of the at least one focusing coil is fixedly sleeved on the lens barrel holder and spaced apart from the respective magnet, and the at least one focusing coil interacts with the at least one magnet to drive the lens barrel holder to move along the optical axis direction, so as to realize an auto-focusing function.

9. The lens driving device of claim 1, wherein the flexible printed circuit further comprises a circuit board body fixed to the base and a pin bent and extended toward the base by one side of the circuit board body.

* * * * *